United States Patent
Lee et al.

(10) Patent No.: US 9,643,154 B2
(45) Date of Patent: May 9, 2017

(54) PROCESS FOR PREPARING CARBON DIOXIDE ADSORBENT AND CARBON DIOXIDE CAPTURE MODULE CONTAINING THE ADSORBENT

(71) Applicant: University-Industry Foundation, Yonsei University, Seoul (KR)

(72) Inventors: Chang Ha Lee, Seoul (KR); Anh Tuan Vu, Seoul (KR); Doo Wook Kim, Seoul (KR); Keon Ho, Seoul (KR)

(73) Assignee: University-Industry Foundation, Yonsei University, Seoul (KR)

(*) Notice: Subject to any disclaimer, the term of this patent is extended or adjusted under 35 U.S.C. 154(b) by 108 days.

(21) Appl. No.: 14/738,108

(22) Filed: Jun. 12, 2015

(65) Prior Publication Data

US 2015/0360199 A1    Dec. 17, 2015

(30) Foreign Application Priority Data

Jun. 12, 2014   (KR) .................. 10-2014-0071272

(51) Int. Cl.
| | |
|---|---|
| B01D 53/02 | (2006.01) |
| B01J 20/04 | (2006.01) |
| B01J 20/30 | (2006.01) |
| B01J 20/28 | (2006.01) |

(52) U.S. Cl.
CPC ............ *B01J 20/041* (2013.01); *B01D 53/02* (2013.01); *B01J 20/28059* (2013.01); *B01J 20/28061* (2013.01); *B01J 20/28071* (2013.01); *B01J 20/28083* (2013.01); *B01J 20/3078* (2013.01); *B01D 2253/1124* (2013.01); *B01D 2257/504* (2013.01); *Y02C 10/04* (2013.01); *Y02C 10/08* (2013.01)

(58) Field of Classification Search
CPC ...... B01D 2253/1124; B01D 2257/504; B01D 53/02; B01J 20/041; B01J 20/28059; B01J 20/28061; B01J 20/28071; B01J 20/28083; B01J 20/3078; Y02C 10/04; Y02C 10/08

See application file for complete search history.

(56) References Cited

U.S. PATENT DOCUMENTS

| | | | | |
|---|---|---|---|---|
| 5,990,373 | A * | 11/1999 | Klabunde ............ | B01D 53/02 423/210 |
| 6,080,281 | A * | 6/2000 | Attia ................... | B01D 53/02 204/157.3 |
| 2013/0247757 | A1 * | 9/2013 | Lee ..................... | B01J 20/06 95/139 |

OTHER PUBLICATIONS

Xiao et al., "Advanced adsorbents based on MgO and K2CO3 for capture of CO2 at elevated temperatures," International Journal of Greenhouse Gas Control, vol. 5, pp. 634-639 (2011).

Li et al., "Fabrication of a new MgO/C sorbent for CO2 capture at elevated temperature," Journal of Materials Chemistry A, vol. 1, pp. 12919-12925, (2013).

Zhang et al., "Roles of double salt formation and NaNO3 in Na2CO3-promoted MgO absorbent for intermediate temperature CO2 removal," International Journal of Greenhouse Gas Control, vol. 12, pp. 351-358 (2013).

(Continued)

*Primary Examiner* — Christopher P Jones
(74) *Attorney, Agent, or Firm* — Panitch Schwarze Belisario & Nadel LLP

(57) ABSTRACT

The present invention relates to a method of preparing a carbon dioxide adsorbent and a carbon dioxide capture module including the adsorbent prepared thereby.

13 Claims, 10 Drawing Sheets

(56) References Cited

OTHER PUBLICATIONS

Cho et al., "Separation of CH4/CO2/N2 Mixture by Pressure Swing Adsorption," Clean Technology, vol. 17, No. 4, pp. 389-394 (Dec. 2011).
Mizunuma et al., CO2 capture system using lithium silicate for distributed power supply, Energy Procedia, vol. 37, pp. 1194-1201 (2013).

\* cited by examiner

Example 2

Example 3

Example 5

Example 6

PROCESS FOR PREPARING CARBON DIOXIDE ADSORBENT AND CARBON DIOXIDE CAPTURE MODULE CONTAINING THE ADSORBENT

CROSS-REFERENCE TO RELATED APPLICATION

This application claims priority to and the benefit of Korean Patent Application No. 2014-0071272, filed Jun. 12, 2014, the disclosure of which is incorporated herein by reference in its entirety.

BACKGROUND

1. Field of the Invention

The present invention relates to a method of preparing a carbon dioxide adsorbent, an adsorbent prepared thereby and a carbon dioxide capture module containing the adsorbent.

2. Discussion of Related Art

Carbon dioxide generated by the combustion of a fossil fuel is the main greenhouse gas generated as the result of an industrial activity. The generated carbon dioxide accumulated in the air increases an average temperature, and thus causes a climate change. As long as an energy efficient alternative that does not emit a greenhouse gas is not developed, a fossil fuel will be continuously consumed, and the concentration of carbon dioxide will gradually increase. Accordingly, controlling the emissions of carbon dioxide and a technique of capturing carbon dioxide will become the most important environmental issue in the world.

A technique of capturing carbon dioxide and a technique of storing the captured carbon dioxide in oceans or geological materials are collectively called carbon capture and storage (CCS). CCS comes to the fore as a solution for reducing the concentration of carbon dioxide. Recently, many studies focused on the removal of carbon dioxide such as cryogenic fractionation, membrane separation, solvent absorption, and physical and chemical sorption with respect to a solid surface have been reported. Cryogenic fractionation has a disadvantage of high energy consumption to remove carbon dioxide in a flue gas. Membrane separation is effective and already used to separate carbon dioxide, but it is difficult to be used throughout a wide range of industrial fields due to a complicated method and a high cost. Currently, solvent absorption is performed using various solvents. Particularly, the solvent absorption based on an amine is already commercially used. However, since a process of absorbing carbon dioxide and regenerating a solvent needs a lower pressure and temperature (40 to 150° C.), an additional process of decreasing a temperature of a flue gas in an industrial process operated at intermediate and high temperatures is needed. While temperatures of a gas input into a turbine and a flue gas of general processes, in addition to an integrated gasification combined cycle (IGCC), are generally in an intermediate temperature range of 150 to 450° C., so far, most adsorption and capture studies have been performed at a low temperature of 100° C. or less. Accordingly, to apply an adsorption process adjusted to a low temperature, an additional process of decreasing the temperature of the gas should be introduced, and therefore, a process operating cost increases. If a solid adsorbent capable of effectively capturing carbon dioxide in the intermediate temperature range is developed, carbon dioxide can be removed without a process of decreasing the temperature of an exhaust gas, and therefore, the process operating cost can be reduced.

Currently, a metal oxide adsorbent being actively studied is known to adsorb carbon dioxide from a low temperature to a high temperature. Particularly, a study on the metal oxide adsorbent based on an alkali metal and an alkali earth metal is progressing in consideration of an adsorbed amount of carbon dioxide and regeneration efficiency. An adsorbent based on lithium, $Li_4SiO_4$, may adsorb a large amount of carbon dioxide, but needs a desorption process at a high temperature (700 to 900° C.) to regenerate the used adsorbent [$CO_2$ capture system using lithium silicate for distributed power supply, Energy Procedia 37 (2013) 1194-1201]. Adsorbents based on Ca perform adsorption at 600 to 700° C., but a high temperature of 800° C. or more is needed for desorption. Even though having excellent adsorbability, an adsorbent having high energy consumption is difficult to be applied commercially in the desorption process for regeneration [Separation of methane from $CH_4/CO_2/N_2$ mixed gases using PSA method, CLEAN TECHNOLOGY, Vol. 17, No. 4, December 2011, pp. 389~394]. Accordingly, in addition to excellent adsorbability, detachment efficiency is also an important consideration to select an adsorbent.

Among various metal oxides, magnesium oxide is a material which is being studied in various ways as a dry adsorbent. Magnesium oxide which facilitates the adsorption of carbon dioxide in the temperature range of the flue gas and can be regenerated at a relatively low temperature is highly valued as a dry adsorbent for carbon dioxide. The MgO-based adsorbent capable of capturing carbon dioxide can be made by processing dolomite at 300 to 450° C. and 20 atm.

In conventional methods of processing an MgO synthesis product, there are precipitation methods [Roles of double salt formation and $NaNO_3$ in $Na_2CO_3$-promoted MgO absorbent for intermediate temperature $CO_2$ removal, International Journal of Greenhouse Gas Control 12 (2013) 351-358; Advanced adsorbents based on MgO and $K_2CO_3$ for capture of $CO_2$ at elevated temperatures, International Journal of Greenhouse Gas Control 5 (2011) 634-639] and simple mixing methods [Roles of double salt formation and NaNO3 in $Na_2CO_3$-promoted MgO absorbent for intermediate temperature $CO_2$ removal, International Journal of Greenhouse Gas Control 12 (2013) 351-358; Fabrication of a new MgO/C sorbent for $CO_2$ capture at elevated temperature, J. Mater. Chem. A, 2013, 1, 12919-12925]. In the precipitation methods, water is used as a solvent, and a product and the solvent are separated using a filter after a reaction. However, due to the use of a filter, salts used to synthesize MgO pass through a filter in an ion state and thus are lost. Simple mixing is a method of physically mixing powders which become the materials of a synthesized MgO compound, and even though it is simple, there is a disadvantage in that it is difficult to obtain a uniform synthesized product due to a low degree of dispersion.

SUMMARY OF THE INVENTION

Accordingly, the present invention has been made in an effort to solve the problems occurring in the related art, and an object of the present invention is to provide a method of preparing an MgO-based carbon dioxide adsorbent by obtaining a product having uniformity due to a high dispersion degree and having a specific surface area and well-developed pores by a reaction of an MgO precursor and various salts in a solution state using a mixed solvent, and rapidly removing the solvent by opening a valve of a high pressure reactor in a super critical state using the high pressure reactor so as not to have a loss of salts constituting a final synthesized MgO compound, to have no loss and compression of a product generated in the process of separating the product from the solvent, to be thermally stable in an intermediate temperature range, and to have high carbon dioxide adsorption capacity and a capability to easily regenerate, and thus the present invention was completed.

Accordingly, the present invention is directed to providing a method of preparing a dry carbon dioxide adsorbent having excellent adsorption capacity with respect to carbon dioxide in a flue gas at an intermediate temperature (200 to 450° C.) and excellent thermal stability and a carbon dioxide adsorbent prepared thereby.

In addition, the present invention is directed to providing a carbon dioxide capture module including the carbon dioxide adsorbent.

In order to achieve the above object, according to one aspect of the present invention, there is provided a method of preparing a carbon dioxide adsorbent, which includes forming a hydrolysis gel by injecting a metal salt into a precursor solution in which a mixed solvent of an aromatic solvent and an alcohol and a magnesium oxide (MgO) precursor are mixed, and stirring the resulting mixture; elevating a temperature of the hydrolysis gel under a super critical condition; maintaining a super critical temperature for 5 to 50 minutes after the temperature is elevated; removing the mixed solvent within 0.1 to 5 minutes under a super critical condition and drying a product; and calcining the dried product.

In order to achieve the above object, according to another aspect of the present invention, there is provided a carbon dioxide adsorbent prepared by the above-described method.

In order to achieve the above object, according to still another aspect of the present invention, there is provided a carbon dioxide capture module including the carbon dioxide adsorbent.

The present invention relates to a method of preparing a carbon dioxide adsorbent and a carbon dioxide capture module including the adsorbent prepared thereby. The carbon dioxide adsorbent prepared by the method is an magnesium oxide (MgO) compound including MgO and various metal salts, which is thermally stable at a temperature range of a flue gas generated in an industrial process, that is, an medium temperature range (200 to 450° C.), and excellently adsorbs carbon dioxide. In addition, when a carbon dioxide capture module including the adsorbent is applied to an industry, an additional process of lowering the temperature of the flue gas may be excluded, and thus a process operating cost is expected to be reduced.

A uniform carbon dioxide adsorbent with a high dispersion degree can be prepared by a reaction of an MgO precursor and various salts (promoters: $KNO_3$, $K_2CO_3$, $NaNO_3$, $Na_2CO_3$, etc.) using an aromatic solvent and an alcohol solvent. In addition, the solvent is induced to a super critical state using a high pressure reactor and then rapidly removed, thereby having no loss of the salts constituting a synthesized MgO compound and no damage and compression of a product that can be generated in the process of separating the product from the solvent. Moreover, the synthesized adsorbent is thermally stable in an intermediate temperature range (200 to 450° C.), has high adsorption capacity and a capability to easily regenerate, and excellently adsorbs carbon dioxide in an IGCC process or in a temperature range (300 to 400° C.) of a flue gas including carbon dioxide.

Unlike a conventional process of adsorbing carbon dioxide by decreasing a temperature of the flue gas generated in an industry, the present invention is expected to reduce energy consumption and an operating cost by directly adsorbing carbon dioxide in the flue gas at an intermediate temperature without an additional process for reducing the temperature. In addition, the present invention can enable industries to be prepared for a restriction of discharging carbon dioxide, which will be further reinforced in the future, and furthermore, it can be expected to create an enormous added value by contributing to the inhibition of a climate change.

BRIEF DESCRIPTION OF THE DRAWINGS

The above objects, other features and advantages of the present invention will become more apparent after a reading of the following detailed description when taken in conjunction with the drawings, in which.

DETAILED DESCRIPTION OF EXEMPLARY EMBODIMENTS

Figure 1:
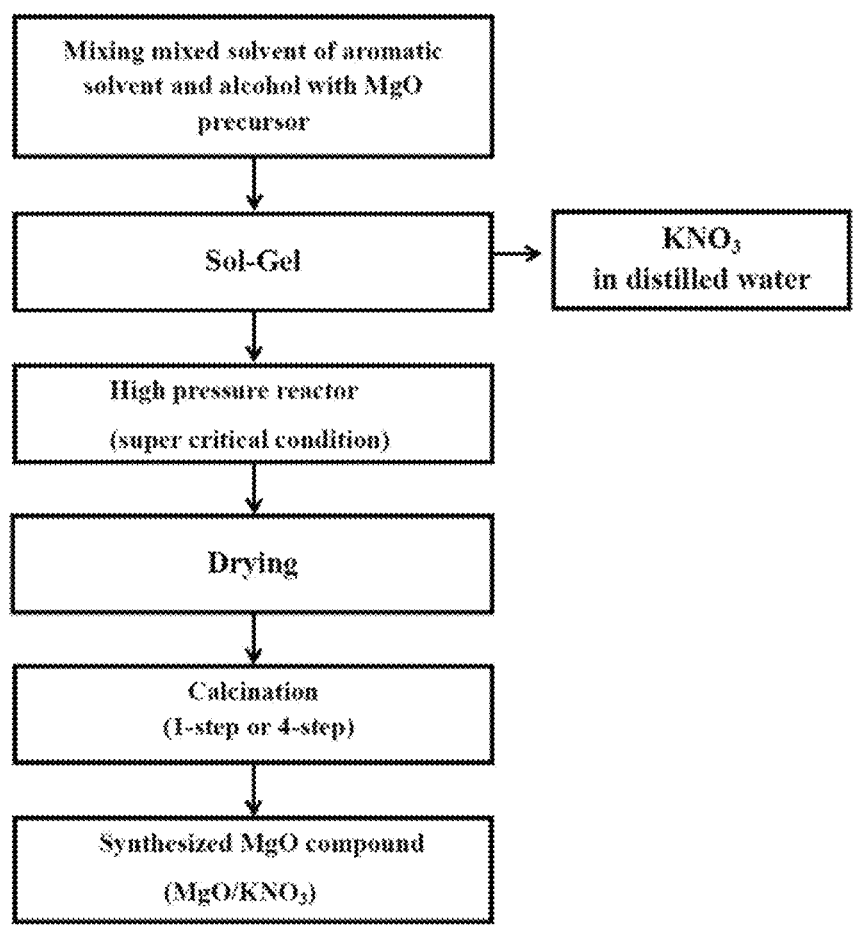
FIG. 1 is a flowchart illustrating a process of preparing a synthesized MgO compound according to Example 1.

The present invention relates to a method of preparing a dry carbon dioxide adsorbent having excellent adsorption capacity with respect to carbon dioxide in a flue gas at an intermediate temperature (200 to 450° C.) and excellent thermal stability.

Particularly, the present invention relates to a method of preparing a carbon dioxide adsorbent, which includes:

forming a hydrolysis gel by injecting a metal salt into a precursor solution in which a mixed solvent of an aromatic solvent and an alcohol and a magnesium oxide (MgO) precursor are mixed and stirring the resulting mixture;

elevating a temperature of the hydrolysis gel to a super critical condition;

maintaining the super critical temperature for 5 to 50 minutes after the temperature is elevated;

removing the mixed solvent within 0.1 to 5 minutes under the super critical condition and drying a product; and calcining the dried product.

First, in the preparation of a solution in which a mixed solvent of an aromatic solvent and an alcohol and an MgO precursor are mixed, here, the solution may be prepared by mixing an MgO precursor diluted in an alcohol with an aromatic solvent.

The aromatic solvent may be at least one selected from the group consisting of benzene, toluene and xylene, and the alcohol may be a lower alcohol having 1 to 4 carbon atoms, for example, methanol or ethanol.

The MgO precursor may be at least one selected from the group consisting of magnesium methoxide and magnesium ethoxide.

The precursor solution may be prepared by mixing the aromatic solvent at 50 to 80 parts by weight and the alcohol at 5 to 20 parts by weight with respect to 1 part by weight of the MgO precursor. The aromatic solvent may decrease a particle size of the product so as to increase a specific surface area, and the super critical condition can be relatively easily made using the alcohol solven. When the aromatic and alcohol solvents are outside of the mixing range, there have problems in which a specific surface area and pores are reduced.

Then, in the formation of a hydrolysis gel by injecting a metal salt into the prepared mixed solution and stirring the resulting mixture, a hydrolysis gel is formed by slowly injecting a metal salt aqueous solution into the mixed solution by a sol-gel reaction and stirring the resulting mixture.

The metal salt may be at least one selected from the group consisting of a metal oxide, a metal carbonate and a metal nitrite, and preferably, $KNO_3$, $K_2CO_3$, $NaNO_3$, $Na_2CO_3$, $Al_2O_3$, $LiNO_3$ or $Li_2CO_3$.

In addition, the metal salt may be used at 0.1 to 1.5 parts by weight with respect to 1 part by weight of the MgO precursor. According to a ratio of the metal salt and MgO, an initial adsorption rate and an adsorbed amount may be controlled. When the metal salt is used at less than 0.1 parts by weight or more than 1.5 parts by weight, the content of the metal salt in MgO is reduced by the reduction or agglomeration of the metal salt in the solution.

The stirring may be performed at 20 to 30° C. for 5 to 20 hours to completely hydrolyze an MgO precursor.

Subsequently, in the elevation of a temperature of the hydrolysis gel to a super critical condition, the hydrolysis gel formed by stirring is transferred to a high pressure reactor, and then the temperature is elevated to a super critical condition of the mixed solvent.

The elevation of a temperature to the super critical condition is a process of applying heat to the hydrolysis gel for 3 to 5 hours to reach 240 to 300° C. (preferably 250 to 290° C.), and when the temperature reaches a desired level through the process, the desired temperature (super critical temperature) may be maintained for 5 to 50 minutes.

In the rapid removal of the mixed solvent and drying the product, an inner pressure is reduced by rapidly discharging the mixed solvent (the aromatic solvent and the alcohol) by opening a valve in the high pressure reactor, and cooling the resulting product to a room temperature and drying a powder product in the high pressure reactor. When the valve in the high pressure reactor is open under the super critical condition, the solvent may be rapidly removed due to a pressure difference. In the conventional art, when a reactant and a solvent are slowly dried at 80° C. or more to separate, a product is compressed, thereby decreasing the development of a specific surface area and pores (since particles are densely formed, the development of the pores and the surface area is inhibited), but in the present invention, when the solvent is rapidly separated in the super critical state, such a compression phenomenon can be prevented. Accordingly, the discharge (removal) of the mixed solvent may be performed within 0.1 to 5 minutes to prevent compression.

The drying may be performed in a vacuum oven at 80 to 120° C. for 5 to 20 hours.

Finally, in the calcination of the dried product, the dried product is calcined to prepare a final synthesized MgO compound. In the present invention, the calcination may be performed through one-step-calcination or four-step-calcination.

The one-step-calcination is performed for 2 to 5 hours after a temperature is elevated to 400 to 500° C. in a nitrogen atmosphere.

The four-step-calcination is performed in a vacuum state by elevating a temperature to 200 to 250° C. and maintaining the temperature for 3 to 6 hours, elevating the temperature to 280 to 300° C. and maintaining the temperature for 0.5 to 2 hours, elevating the temperature to 330 to 380° C. and maintaining the temperature for 1 to 3 hours, and elevating the temperature to 400 to 500° C. and maintaining the temperature for 3 to 6 hours.

The elevation of the temperature may be performed at a rate of 0.5 to 2° C./min.

In addition, the present invention includes a carbon dioxide adsorbent prepared by the above-described method.

The carbon dioxide adsorbent may have a specific surface area of 10 to 150 $m^2/g$, a pore volume of 0.01 to 0.50 cc/g, and an average pore diameter of 2 to 50 nm, and have excellent carbon dioxide adsorption capacity in a flue gas, particularly, at an intermediate temperature (200 to 450° C.) and excellent thermal stability.

In addition, the present invention includes a carbon dioxide capture module including the carbon dioxide adsorbent.

The carbon dioxide adsorbent may be charged in a column before use, but the present invention is not particularly limited thereto. The carbon dioxide adsorbent has excellent thermal stability and excellent adsorption capacity between 200° c. to approximately 450° C., and therefore the carbon dioxide capture module may be operated at a temperature of 200 to 450° C.

In addition, when the carbon dioxide capture module including the adsorbent is applied to an industry, an additional process of lowering the temperature of the flue gas can be excluded, and thus it is be expected to reduce a process operating cost.

Hereinafter, the present invention will be described in further detail with reference to examples according to the present invention, but the scope of the present invention is not limited to the following examples.

EXAMPLE 1

Preparation of synthesized MgO compound ($MgO/KNO_3$); one-step-calcination

A precursor solution was prepared by stirring 1.3 g of an MgO precursor, magnesium methoxide ($Mg(OCH_3)_2$), in a mixed solvent including 87 g of toluene (100 ml) and 15 g of methanol for 30 minutes (100 ml of toluene, and 20 ml of a solution in which 8 wt % of magnesium methoxide is diluted in methanol were used, and the mass of the solution was 16.3 g). An aqueous solution in which 0.3 g of $KNO_3$ was diluted in 1.8 ml of distilled water was gradually injected into the stirring solution using a syringe. After the injection, at first, a white precipitate occurred and then was gradually diluted and changed into a clear solution, and matured through stirring at room temperature (25° C.) for 12 hours (sol-gel process). The hydrolysis gel generated through the above process was transferred to a high pressure reactor. Nitrogen was flowed in the high pressure reactor to remove the inner gas, and the inner temperature was elevated to 265° C., which was the super critical condition of the mixed solvent, at a rate of 1° C./min (for 4 and ½ hours). When 265° C. was reached, the inner temperature was maintained for 10 minutes. Afterward, the mixed solvent (toluene and methanol) in the high pressure reactor was rapidly discharged (removed) within 30 seconds by opening a valve of the high pressure reactor so as to reduce an inner pressure. Subsequently, the resulting product was cooled to room temperature, and then the powder product in the high pressure reactor was put into a vacuum oven and dried at 120° C. for 12 hours. The temperature of the dried powder product was elevated from the room temperature (25° C.) to 450° C. at a rate of 10° C./min, and calcined at 450° C. for 3 hours. Such a calcination process is called "one-step-calcination," and the process of preparing as synthesized MgO compound according to the calcination process was briefly summarized in FIG. 1.

EXAMPLE 2

Preparation of Synthesized MgO compound (MgO/$KNO_3$); four-step-calcination

A synthesized MgO compound was prepared as described in Example 1, except that a calcination process was performed as follows:

A dried powder product was calcined four times in a vacuum state.

First, a temperature was elevated from room temperature (25° C.) to 220° C. at a rate of 1° C./min, and maintained at 220° C. for 5 hours. Secondly, the temperature was elevated to 280° C. at a rate of 1° C./min and maintained at this temperature for 1 hour, and thirdly, the temperature was elevated to 350° C. at a rate of 0.8° C./min and maintained at this temperature for 2 hours. Finally (fourthly), the temperature was elevated to 450° C. at a rate of 0.8 ° C./min and then maintained, and calcination was performed for 5 hours. Such calcination is called "four-step-calcination."

EXAMPLE 3

Preparation of synthesized MgO compound (MgO/$Na_2CO_3$/$KNO_3$); 1-step-calcination A process was performed as described in Example 1, except that an aqueous solution in which 0.6 g of $Na_2CO_3$ and 0.3 g of $KNO_3$ were diluted in 1.8 ml of distilled water was gradually injected into a stirring precursor solution using a syringe.

EXAMPLE 4

Preparation of synthesized MgO compound (MgO/$Na_2CO_3$/$KNO_3$); four-step-calcination A process was performed as described in Example 2, except that an aqueous solution in which 0.6 g of $Na_2CO_3$ and 0.3 g of $KNO_3$ were diluted in 1.8 ml of distilled water was gradually injected into a stirring precursor solution using a syringe.

EXAMPLE 5

Preparation of synthesized MgO compound (MgO/$Na_2CO_3$/$NaNO_3$); one-step-calcination A process was performed as described in Example 1, except that an aqueous solution in which 0.3 g of $Na_2CO_3$ and 0.25 g of $NaNO_3$ were diluted in 1.8 ml of distilled water was gradually injected into a stirring precursor solution using a syringe.

EXAMPLE 6

Preparation of synthesized MgO compound (MgO/$Na_2CO_3$/$NaNO_3$); one-step-calcination A process was performed as described in Example 1, except that an aqueous solution in which 0.15 g of $Na_2CO_3$ and 0.25 g of $NaNO_3$ were diluted in 1.8 ml of distilled water was gradually injected into a stirring precursor solution using a syringe.

EXAMPLE 7

Preparation of synthesized MgO compound (MgO/$Na_2CO_3$/$NaNO_3$); one-step-calcination A process was performed as described in Example 1, except that an aqueous solution in which 0.08 g of $Na_2CO_3$ and 0.25 g of $NaNO_3$ were diluted in 1.8 ml of distilled water was gradually injected into a stirring precursor solution using a syringe.

COMPARATIVE EXAMPLE 1

Most of the components consisted of carbon materials, had high adsorbability and a low cost, and therefore active carbon commercially used in various ways was used.

As an activated carbon, 2GA-H2J manufactured by KURARAY CHEMICAL Co., Ltd. was used, and physical properties of the activated carbon were shown in Table 1.

TABLE 1

| Property | Activated carbon |
|---|---|
| Type | Cylindrical |
| Particle size (mm) | 1.7-2.4 |
| Particle porosity (g/cm$^3$) | 0.43 |
| Average pore diameter (nm) | 1.67 |
| Pellet density (g/cm$^3$) | 0.85 |
| Heat capacity (cal/gK) | 0.25 |
| Total surface area (m2/g) | 1306.4 |

COMPARATIVE EXAMPLE 2

MgO (<50 nm particle size) purchased from Sigma-Aldrich Corp. was used.

COMPARATIVE EXAMPLE 3

Pure MgO was synthesized by the same method as described in Example 1, except that 1.8 ml of pure distilled water, instead of an aqueous solution in which KNO$_3$ was diluted in 1.8 ml of distilled water, was injected.

EXPERIMENT EXAMPLE 1

Analysis of Structure of Synthesized MgO Compound

Structures of synthesized MgO compounds of Examples 2, 3 and 5 were analyzed using scanning electron microscope (SEM) analysis.

Figure 2:
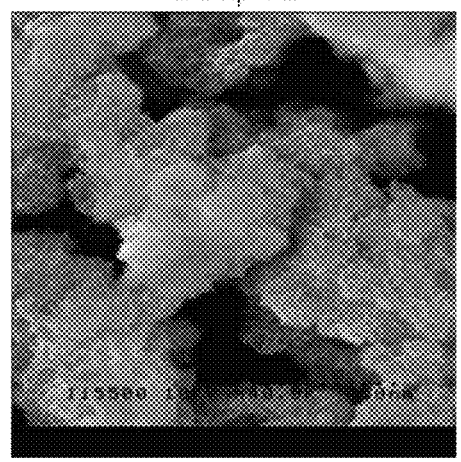
FIG. 2 shows a result of a scanning electron microscope (SEM) analysis for a synthesized MgO compound according to Examples 2, 3 and 5.
Figure 2:
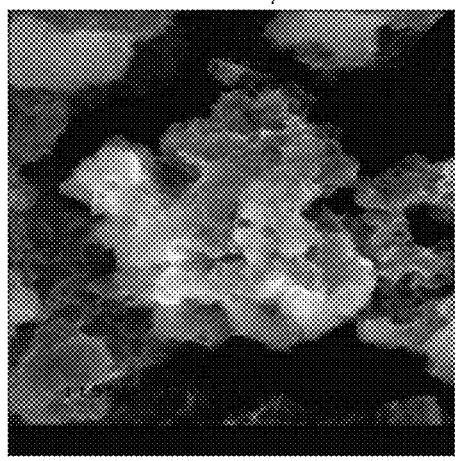
Figure 2:
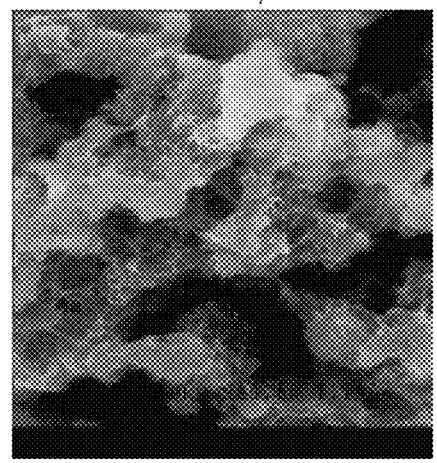

As shown in FIG. 2, the structures of the three synthesized MgO compounds were formed by agglomerating thin plate-shaped materials, and had many pores.

EXPERIMENTAL EXAMPLE 2

Measurement of Specific Surface Area of Synthesized MgO Compound

Specific surface areas of the synthesized MgO compounds according to Examples 1 to 7 [expressed as Ex(1) to (7) in the drawing] and comparative materials according to Comparative Examples 1 to 3 were measured through an isothermal reaction of adsorbing/detaching nitrogen using an Autosorb-iQ MP manufactured by Quantachrome instruments. All of the synthesized MgO compounds were porous materials having mesopores (diameter: 1 to 50 nm), and showed H3-type hysteresis loop.

Figure 3:
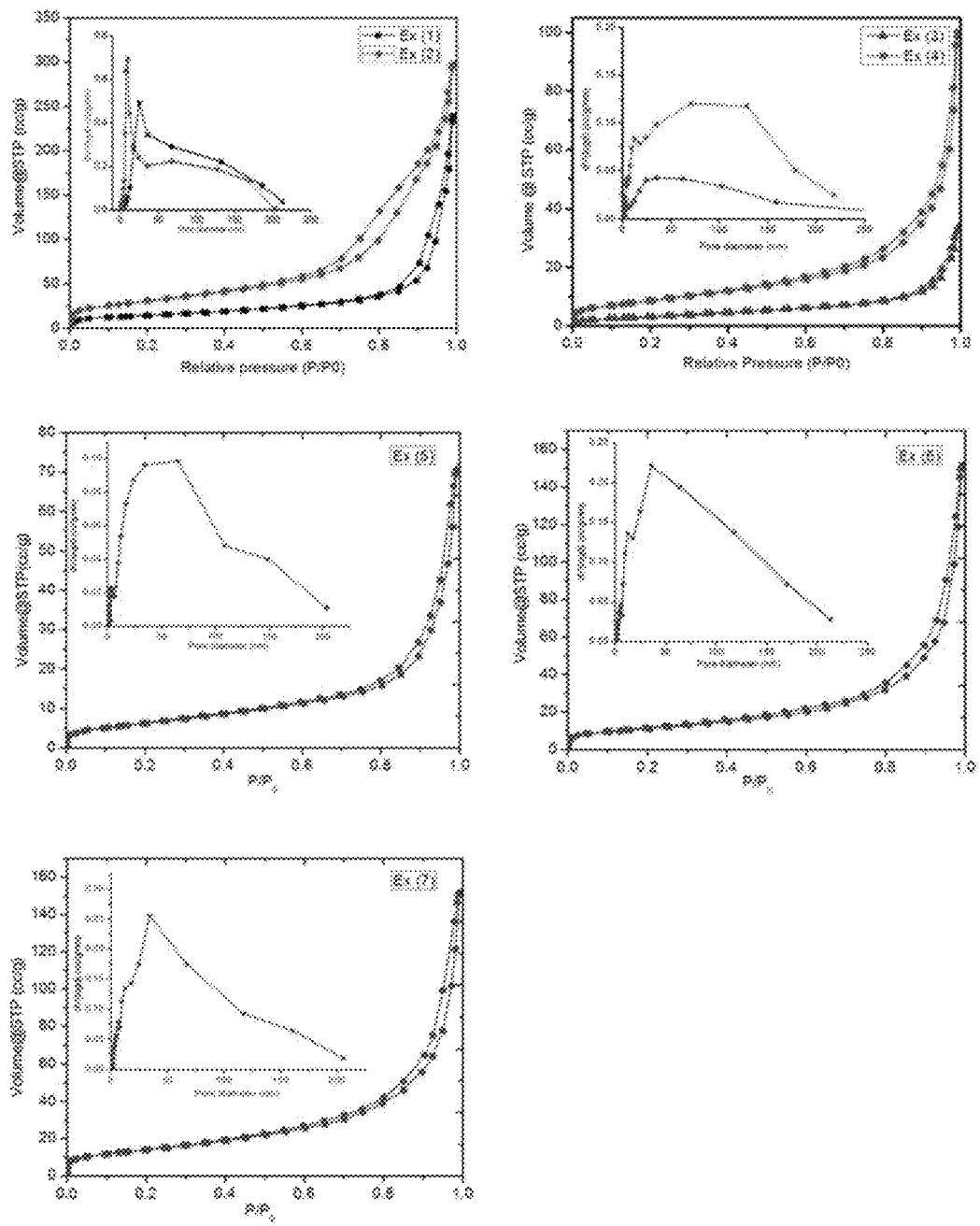
FIG. 3 is a graph showing a result obtained by measuring a specific surface area of a synthesized MgO compound according to Examples 1 to 7.

In addition, it can be noted that, compared to the examples, the synthesized MgO compounds had different specific surface areas according to the number, type, and mixed ratio of the salts [Table 2 and FIG. 3].

TABLE 2

| Division | BET Surface area (m$^2$/g) | BJH pore volume (cc/g) | BJH pore diameter (nm) | SF micropore volume (cc/g) | Average pore diameter (nm) |
|---|---|---|---|---|---|
| Example 1 | 51 | 0.37 | 11.85 | 0.01 | 29.10 |
| Example 2 | 110 | 0.47 | 7.85 | 0.03 | 16.70 |
| Example 3 | 11 | 0.054 | 1.17 | 0.004 | 18.50 |
| Example 4 | 31 | 0.157 | 3.79 | 0.008 | 19.90 |
| Example 5 | 22 | 0.111 | 2.42 | 0.006 | 19.55 |
| Example 6 | 39 | 0.236 | 9.52 | 0.012 | 23.77 |
| Example 7 | 50 | 0.237 | 3.39 | 0.015 | 18.81 |
| Comparative Example 1 | 1336 | 0.451 | 1.19 | 0.459 | 2.18 |
| Comparative Example 2 | 218 | 0.859 | 1.19 | 0.056 | 15.33 |
| Comparative Example 3 | 569 | 1.921 | 5.76 | 0.147 | 9.49 |

EXPERIMENTAL EXAMPLE 3

XRD Analysis for Synthesized MgO Compound

X-ray diffraction (XRD) analysis was performed on the synthesized MgO compounds prepared in Examples 1, 2, 3 and 5.

Figure 4:
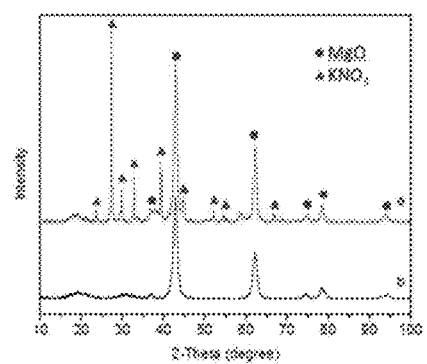
FIG. 4 is a graph showing a result of an x-ray diffraction (XRD) analysis for a synthesized MgO compound according to Examples 1, 2, 3 and 5.
Figure 4:
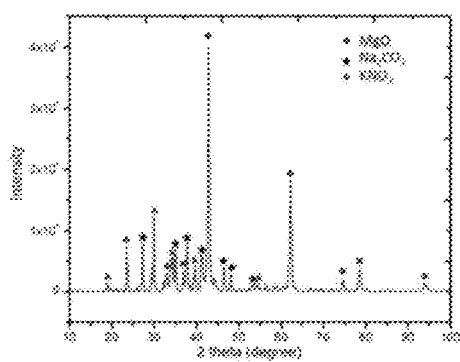
Figure 4:
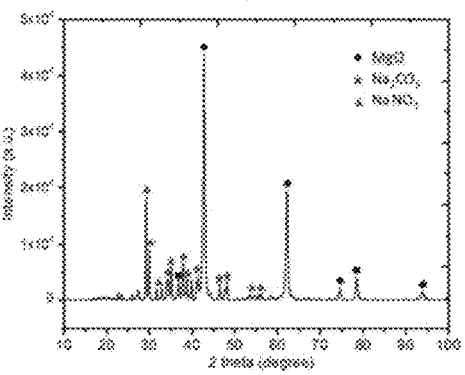

Referring to the XRD result of FIG. 4, it can be confirmed that the material according to Example 1 included MgO and KNO$_3$, and the material according to Example 2 did not have an apparent KNO$_3$ peak, which indicated that the KNO$_3$ salts were well dispersed. In addition, it can be confirmed that the materials according to Examples 3 and 5 contained MgO, Na$_2$CO$_3$ and KNO$_3$, and MgO, Na$_2$CO$_3$ and NaNO$_3$, respectively.

EXPERIMENTAL EXAMPLE 4

Carbon Dioxide Adsorption Test Using Synthesized MgO Compound

Each of the synthesized MgO compounds according to Examples 1 to 7 and the comparative materials according to Comparative Examples 1 to 3 was charged in a quartz column at 15 mg, and nitrogen was flowed until they reached a desired temperature. When they reached the desired temperature, a pure carbon dioxide gas was flowed at a rate of 30 ml/min to perform a carbon dioxide adsorption test.

Carbon dioxide adsorption capacity was measured with respect to the synthesized MgO compounds according to Examples 1 to 7 and the comparative materials according to Comparative Examples 1 to 3, and the adsorption capacity was calculated by Equation 1.

$$CO_2 \text{ uptake (wt \%)} = (CO_2 \text{ content(g)/weight of adsorbent(g)}) \times 100 \qquad [\text{Equation 1}]$$

Total rate: 30 ml/min

Figure 5:
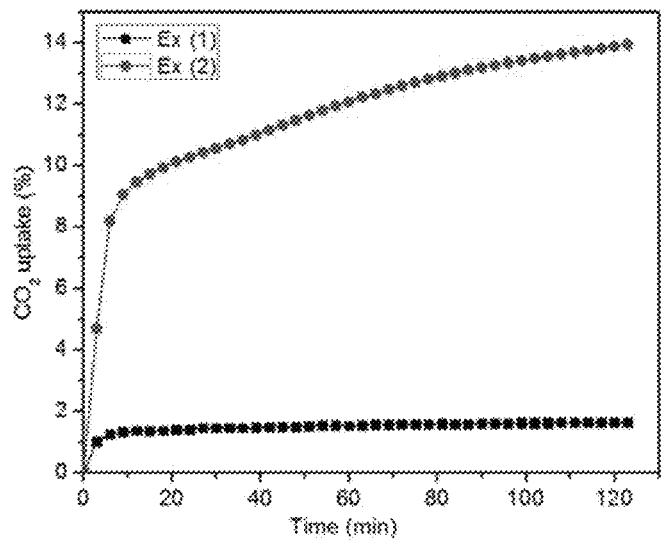
FIG. 5 is a graph showing a result of a carbon dioxide adsorption test according to a method of calcining a synthesized MgO compound according to Examples 1 to 4.
Figure 5:
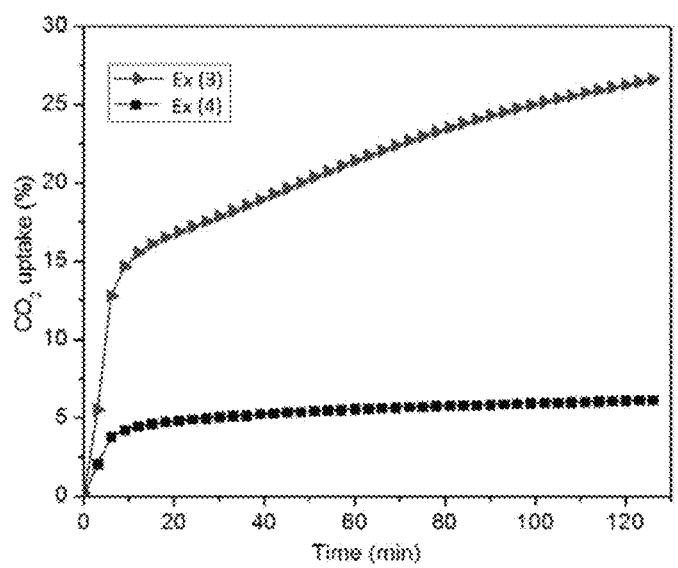

Weights of the charged synthesized MgO compounds and materials of comparative examples: 15 mg 1) Evaluation of Adsorption Capacity According to Calcination Adsorption capacity was evaluated with respect to the synthesized MgO compounds of Examples 1, 2, 3 and 4 at a predetermined temperature (325° C.). The synthesized MgO compounds of Examples 1 and 2 in which one salt, other than MgO, was mixed showed adsorption capacity of 1.5 wt % and 14 wt %, respectively, and the synthesized MgO compounds of Examples 3 and 4 in which two salts, other than MgO, showed adsorption capacity of 27 wt % and 5 wt %, respectively. When one salt, other than MgO, was mixed (Examples 1 and 2), the adsorption capacity of the synthesized MgO compound treated with four-step-calcination was higher, and when two salts, other than MgO, were mixed (Examples 3 and 4), the synthesized MgO compound treated with 1-step-calcination showed a higher adsorption capacity [FIG. 5].

2) Evaluation of Adsorbability According to Temperature

The synthesized MgO compounds of Examples 2 and 3 each were charged in a quartz column, and a carbon dioxide adsorption test was performed on the synthesized MgO compounds at temperature ranges of 30 to 400° C. and 250 to 445° C., respectively, so as to evaluate adsorption capacity.

Figure 6:
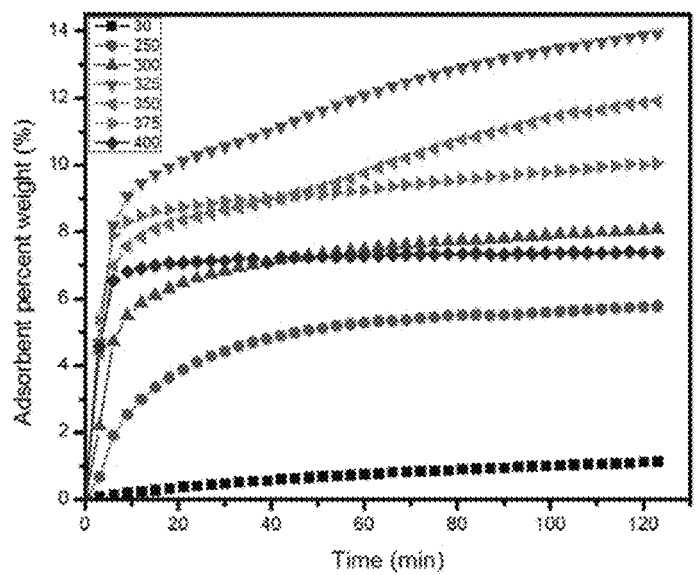
FIG. 6 is a graph showing a result of a carbon dioxide adsorption test according to a temperature of a synthesized MgO compound according to Examples 2 and 3.
Figure 6:
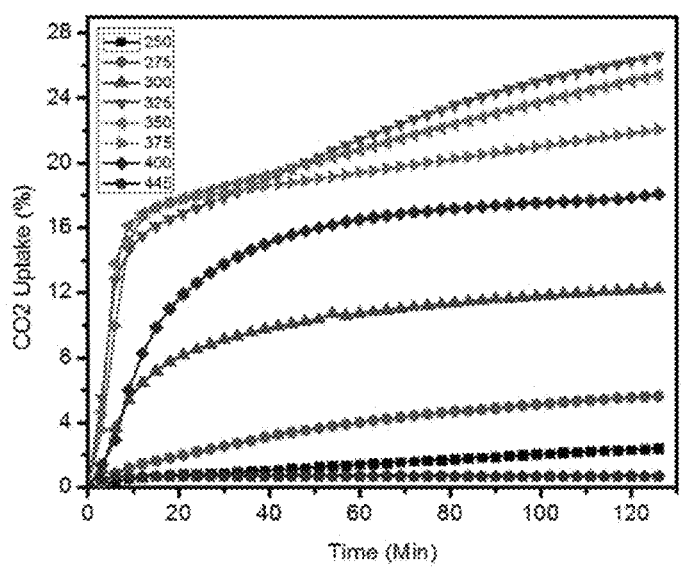

Both of the synthesized MgO compounds of Examples 2 and 3 showed the highest adsorption capacity of approximately 14 wt % and 27 wt % at 325° C., respectively, and it can be confirmed that they had a high level of adsorption capacity in an intermediate temperature range of 325 to 375° C. [FIG. 6].

3) Evaluation of Adsorption Capacity of Example 3 and Comparative Examples 1 to 3 at Predetermined Temperature (325° C.)(Comparative Example 1: Activated Carbon, Comparative Example 2: Commercially Available MgO, and Comparative Example 3: Synthesized MgO)

Adsorption capacity was evaluated with respect to the synthesized MgO compound of Example 3 and the comparative materials of Comparative Examples 1 to 3 at a predetermined temperature (325° C.).

Figure 7:
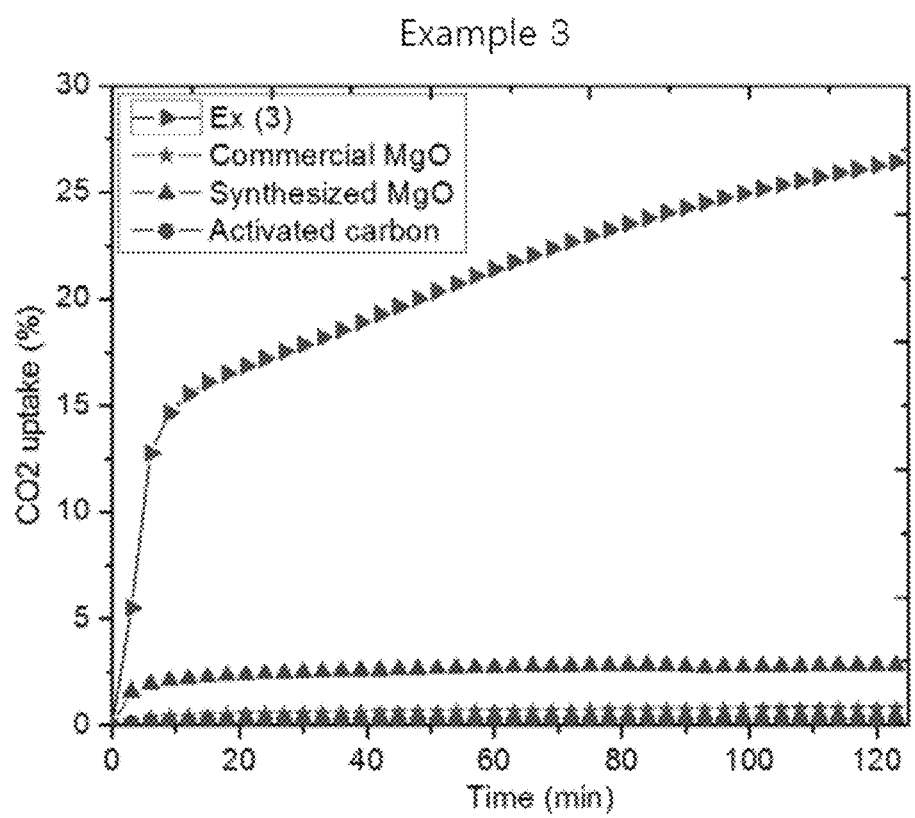
FIG. 7 is a graph showing a result of a carbon dioxide adsorption test for a synthesized MgO compound and a comparative material according to Example 3 and Comparative Examples 1 to 3 at a predetermined temperature.

While the synthesized MgO compound of Example 3 showed high adsorption capacity of 27 wt %, the material of Comparative Example 3 showed adsorption capacity of 2.5 wt % and the materials of Comparative Examples 1 and 2 showed a very low adsorption capacity. It can be noted that the synthesized MgO compound had higher adsorption capacity than those of other comparative examples at an intermediate temperature (325° C.). In addition, this means that the synthesized MgO compound of Example 3, compared to other examples and comparative examples, showed a sharp gradient at a starting point (0 min) of adsorption, and the carbon dioxide adsorption rate at an initial time was very high [FIG. 7].

4) Evaluation of Adsorption Capacity According to a Mixed Ratio of Salts at Predetermined Temperature (325° C.)

Figure 8:
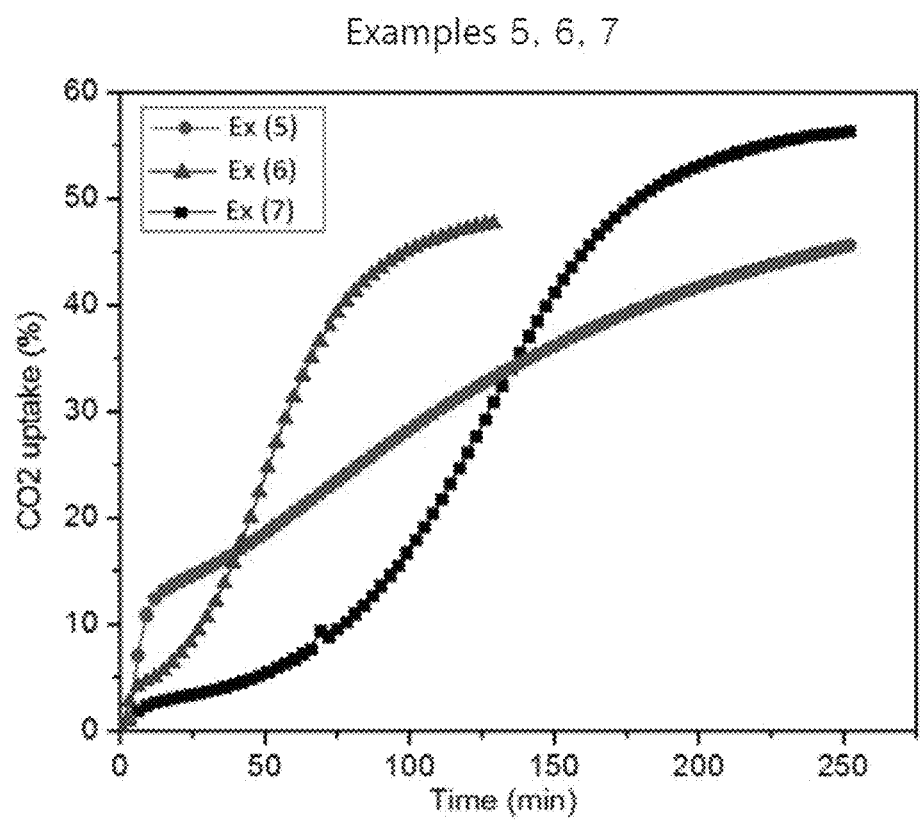
FIG. 8 is a graph showing a result of a carbon dioxide adsorption test according to an amount of a salt of a synthesized MgO compound according to Examples 5 to 7.

Effects of mixed ratios of MgO and a salt in the synthesized MgO compounds according to Examples 5 to 7 at a predetermined temperature (325° C.) were evaluated. The synthesized MgO compound of Example 5 having a high ratio of $Na_2CO_3$ had a high initial adsorption rate, but a lower adsorption capacity than those of the other synthesized MgO compounds. Meanwhile, the synthesized MgO compound of Example 7 having a low ratio of $Na_2CO_3$ had a higher adsorption capacity but a lower initial adsorption rate than that of Example 5. Therefore, it can be confirmed that the initial adsorption rate and the adsorption capacity can be controlled by controlling the mixed ratio of MgO and a salt [FIG. 8].

EXPERIMENTAL EXAMPLE 5

Carbon Dioxide Adsorption Test in Mixed Gas Using Synthesized MgO Compound 15 mg of the synthesized MgO compound according to Example 6 was charged in a quartz column, and nitrogen was flowed until reaching a desired temperature (300° C.). When the synthesized MgO compound reached the desired temperature, three mixed gases each were flowed at a rate of 30 ml/min, so as to perform a carbon dioxide adsorption test.

Figure 9:
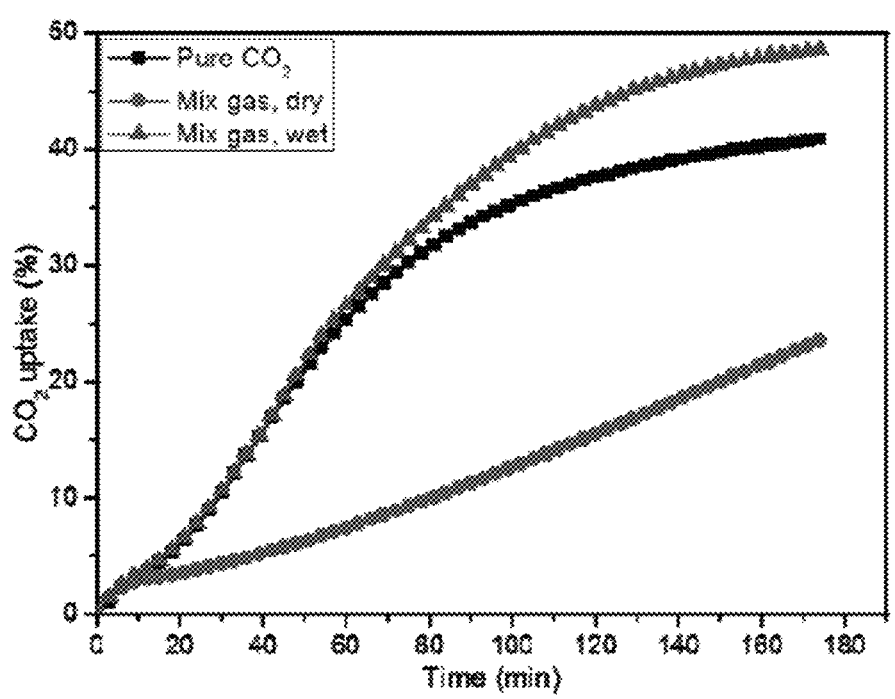
FIG. 9 is a graph showing a result of a carbon dioxide adsorption test according to components of a mixed gas of a synthesized MgO compound according to Example 6.

The carbon dioxide adsorbability of the synthesized MgO compound was measured with respect to the three mixed gases, the results are shown in FIG. 9.

Three mixed gases (vol %)

1) Pure $CO_2$: carbon dioxide 100%

2) Dry mixed gas: nitrogen 87%, carbon dioxide 13%

3) Wet mixed gas: nitrogen 85%, vapor 2%, carbon dioxide 13%

Total rate: 30 ml/min

Weight of the charged synthesized MgO compound: 15 mg

Effects of components of the gases on the carbon dioxide adsorption capacity of the synthesized MgO compound according to Example 6 were evaluated.

When pure carbon dioxide, nitrogen/carbon dioxide, and nitrogen/vapor/carbon dioxide were used at a predetermined temperature (300° C.) for 175 minutes, the carbon dioxide adsorption capacity was 40 wt %, 25 wt % and 50 wt %, respectively. Compared to the nitrogen/carbon dioxide mixed gas, when the pure carbon dioxide was used, the adsorption capacity was higher, but when 2 vol % of vapor was added to the mixed gas, the carbon dioxide adsorption capacity was increased two-fold, thereby obtaining adsorption capacity of 50 wt %, which was higher than that when the pure carbon dioxide was used [FIG. 9]. According to the reference [Efficient MgO-based mesoporous $CO_2$ trapper and its performance at high temperature, Journal of Hazardous Materials 203-204 (2012) 341-347, $MgO/Al_2O_3$ Sorbent for $CO_2$ Capture, Energy Fuels 2010, 24, 5773-5780], a certain range of vapor can improve carbon dioxide adsorption capacity.

EXPERIMENTAL EXAMPLE 6

Figure 10:
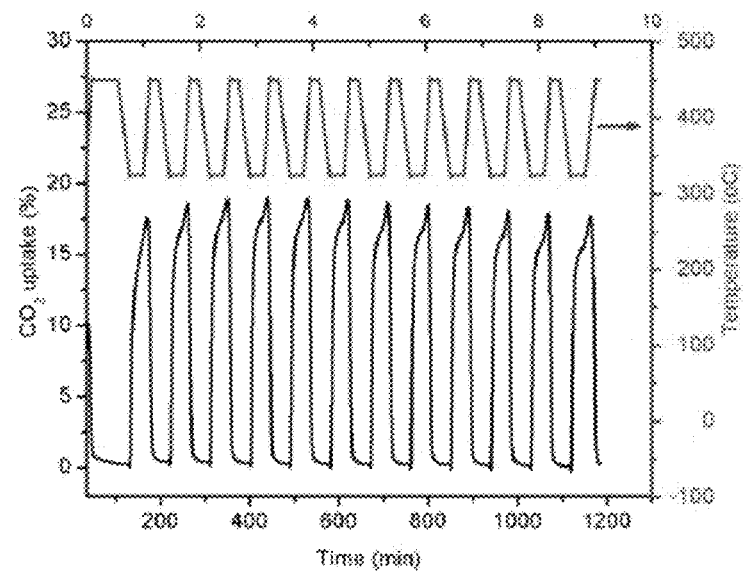
FIG. 10 is a graph showing a result of a carbon dioxide isothermal adsorption and regeneration test for a synthesized MgO compound according to Examples 3 and 5.
Figure 10:
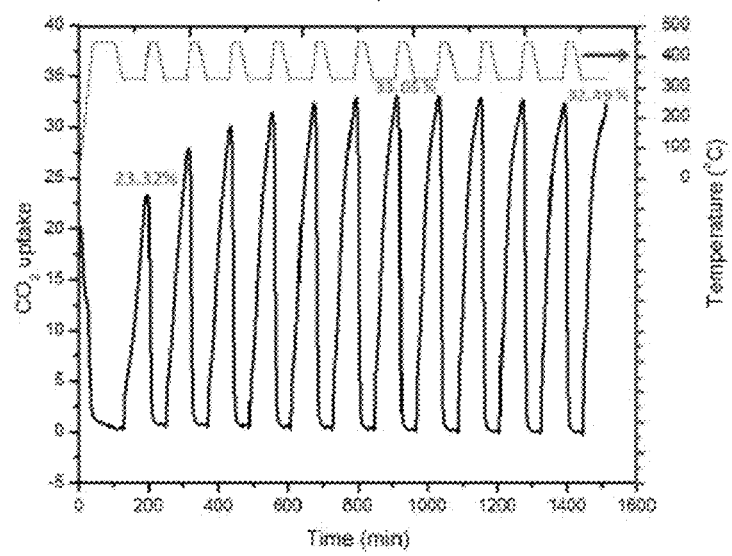

Carbon Dioxide Iisothermal Adsorption/Regeneration Test of Synthesized MgO Compound A carbon dioxide isothermal adsorption/regeneration test was performed by charging the synthesized MgO compounds of Examples 3 and 5 each in a quartz column at 15 mg at a predetermined temperature (325° C.), and flowing pure carbon dioxide under the following conditions. A change in carbon dioxide adsorption capacity was observed for 12 cycles, and the results are shown in FIG. 10.

Input gas: pure $CO_2$

Total rate: 30 ml/min

Weight of the charged synthesized MgO compound: 15 mg

According to the progression of cycles, the synthesized MgO compound of Example 3 maintained adsorption capacity of approximately 17.5 wt % without a great change in adsorption capacity. The synthesized MgO compound of Example 5 seemed to have increased adsorption capacity according to the number of cycles in the beginning, but after a $6^{th}$ cycle, maintained high adsorption capacity of approximately 32.5 wt %. It can be confirmed that the synthesized MgO compound had no substantial change in adsorption capacity according to the progression of cycles, and was proved as a regenerable carbon dioxide adsorbent [FIG. 10].

What is claimed is:

1. A method of preparing a carbon dioxide adsorbent, comprising:
   forming a hydrolysis gel by injecting a metal salt into a precursor solution in which a mixed solvent of an aromatic solvent and an alcohol, and a magnesium oxide (MgO) precursor are mixed and stirring the resulting mixture;
   elevating a temperature of the hydrolysis gel to a super critical condition;
   after the elevating of the temperature, maintaining the super critical temperature for 5 to 50 minutes;
   removing the mixed solvent within 0.1 to 5 minutes under the super critical condition and drying a product; and
   calcining the dried product.

2. The method according to claim 1, wherein the aromatic solvent is at least one selected from the group consisting of benzene, toluene and xylene.

3. The method according to claim 1, wherein the alcohol is a lower alcohol having 1 to 4 carbon atoms.

4. The method according to claim 1, wherein the MgO precursor is at least one selected from the group consisting of magnesium methoxide and magnesium ethoxide.

5. The method according to claim 1, wherein the mixed solution includes the aromatic solvent at 50 to 80 pars by weight and the alcohol at 5 to 20 parts by weight with respect to 1 part by weight of the MgO precursor.

6. The method according to claim 1, wherein the metal salt is at least one selected from the group consisting of a metal oxide, a metal carbonate and a metal nitrate.

7. The method according to claim 1, wherein the metal salt is included at 0.1 to 1.5 parts by weight with respect to 1 part by weight of the MgO precursor.

8. The method according to claim 1, wherein the stirring is performed at 20 to 30° C. for 5 to 20 hours.

9. The method according to claim 1, wherein the super critical condition is obtained by applying heat at 240 to 300° C. for 3 to 5 hours.

10. The method according to claim 1, wherein the super critical temperature is 240 to 300° C.

11. The method according to claim 1, wherein the drying is performed at 80 to 120° C. for 5 to 20 hours.

12. The method according to claim 1, wherein the calcining is performed for 2 to 5 hours after the temperature is elevated to 400 to 500° C. in a nitrogen atmosphere.

13. The method according to claim 1, wherein the calcining is performed in a vacuum state by elevating a temperature to 200 to 250° C. and maintaining the temperature for 3 to 6 hours, elevating the temperature to 280 to 300° C. and maintaining the temperature for 0.5 to 2 hours, elevating the temperature to 330 to 380° C. and maintaining the temperature for 1 to 3 hours, and elevating the temperature to 400 to 500° C. and maintaining the temperature for 3 to 6 hours.

\* \* \* \* \*